(12) United States Patent
Bathon (10) Patent No.: US 8,186,124 B2
(45) Date of Patent: May 29, 2012

(54) CONNECTION DEVICE AND METHOD OF MANUFACTURING A CONNECTION DEVICE

(75) Inventor: Tobias Bathon, Glattbach (DE)

(73) Assignee: Leander Bathon, Glattbach (DE)

( * ) Notice: Subject to any disclaimer, the term of this patent is extended or adjusted under 35 U.S.C. 154(b) by 375 days.

(21) Appl. No.: 12/324,929

(22) Filed: Nov. 28, 2008

(65) Prior Publication Data

US 2009/0145076 A1 Jun. 11, 2009

(30) Foreign Application Priority Data

Nov. 30, 2007 (DE) .......................... 10 2007 058 146

(51) Int. Cl.
*E04B 1/38* (2006.01)

(52) U.S. Cl. .......... 52/701; 52/309.3; 52/515; 52/585.1; 52/745.21; 403/263; 403/267

(58) Field of Classification Search .................. 403/263, 403/267, 238, 240; 52/309.3, 515, 582.1, 52/585.1, 586.1, 699, 701, 745.21; 411/82, 411/82.1

See application file for complete search history.

(56) References Cited

U.S. PATENT DOCUMENTS

| | | | | | |
|---|---|---|---|---|---|
| 569,235 | A | * | 10/1896 | Rockwell | 403/265 |
| 961,992 | A | * | 6/1910 | Underwood | 403/267 |
| 3,405,592 | A | * | 10/1968 | Blodee | 411/389 |
| 3,502,359 | A | * | 3/1970 | Lucci | 403/267 |
| 3,756,635 | A | * | 9/1973 | Beers | 312/111 |
| 4,110,053 | A | * | 8/1978 | Buchholz | 403/361 |
| 4,925,331 | A | * | 5/1990 | Bertsche | 403/267 |
| 5,037,234 | A | * | 8/1991 | De Jong | 403/268 |
| 5,466,086 | A | * | 11/1995 | Goto | 403/268 |
| 5,560,174 | A | * | 10/1996 | Goto | 52/655.1 |
| 5,660,492 | A | * | 8/1997 | Bathon | 403/267 |
| 5,954,447 | A | * | 9/1999 | Bathon | 403/267 |
| 6,120,207 | A | * | 9/2000 | Goto | 403/268 |
| 6,176,638 | B1 | * | 1/2001 | Kellison et al. | 403/268 |
| 6,393,793 | B1 | * | 5/2002 | Pedone | 52/655.1 |
| 2005/0042023 | A1 | * | 2/2005 | Jones | 403/267 |
| 2007/0003363 | A1 | * | 1/2007 | Tseng | 403/238 |
| 2007/0269262 | A1 | * | 11/2007 | Bertsche | 403/267 |
| 2009/0133359 | A1 | * | 5/2009 | Kauppila | 52/745.21 |

FOREIGN PATENT DOCUMENTS

DE 44 45 108 A1 6/1996
EP 0657593 A2 * 5/1994

* cited by examiner

*Primary Examiner* — Brian Glessner
*Assistant Examiner* — Adriana Figueroa
(74) *Attorney, Agent, or Firm* — Da Vinci Partners LLC

(57) ABSTRACT

Connection device having at least one receiving building component, in particular a wooden body (1), which comprises at least a retention recess (2), in particular a continuous retention recess, and having a composite body (3) which is inserted into the retention recess (2) in the wooden body (1), wherein a composite mass (4) is curably inserted in an interstice (7) in the retention recess (2) between the wooden body (1) and the inserted composite body (3) such that the composite body is substantially frictionally secured in said retention recess (2), wherein an intermediate layer (5), in particular as a formation of the surface of the composite body and/or the composite mass, is at least partially provided between the composite body and the composite mass, providing at least partial decoupling of the composite mass from the composite body.

16 Claims, 9 Drawing Sheets

CONNECTION DEVICE AND METHOD OF MANUFACTURING A CONNECTION DEVICE

The invention relates to a connection device having at least one receiving building component, in particular a wooden body, which comprises at least a retention recess, in particular a continuous retention recess, and having at least one composite body which is inserted into the retention recess in the wooden body, according to the preamble of claim 1, as well as to a method of manufacturing a connection device according to the preamble of claim 14.

Connection devices are known for instance from DE 44 45 108 A1, showing a connection system of/for wooden materials and other materials using adhesion.

There is a drawback that due to different expansion coefficients of the connected materials and due to different load properties, there exists a risk of detachment of the connection. In particular, wooden bodies in the form of cut or refined material tend to change in cross section when exposed to a change in climate.

Therefore, it is an object of the present invention to provide a safe and reliable connection device which may include different material properties.

This object is achieved by a connection device having a receiving building component, in particular a wooden body, which comprises at least a retention recess, in particular a continuous retention recess, and having a composite body which is inserted into the retention recess in the wooden body, wherein a composite mass is curably inserted in an interstice in the retention recess between the wooden body and the inserted composite body such that the composite body is substantially frictionally secured in the retention recess, wherein an intermediate layer, in particular as a formation of the surface of the composite body and/or the composite mass, is at least partially provided between the composite body and the composite mass, thus providing at least partial decoupling of the composite mass from the composite body.

The intermediate layer in the contacting surface of composite body and composite mass allows the adjacent materials to be decoupled without influencing the load carrying capacity. As a result, the wooden body is allowed to change in shape without any noticeable weakening of the mechanical engagement between the composite body and the composite mass. At the same time, this decoupling allows a cross-sectional change in the unit of composite mass and wooden body due to adhesion of composite mass to the wooden body. This guarantees—even without adhesive connection between composite mass and composite body—permanent reliability of the connection coupling. The intermediate layer at least partially eliminates the mechanical junction between the composite mass and the composite body. This causes the center of force transmission of the composite body to be shifted deeper into the wooden body, thus reducing the risk of splitting of the wooden material.

Advantageously, the composite body comprises at feast a local recess, i.e. an area by area recess, formed such that after setting of the composite mass in the interstice, in particular in the local recess, frictional mechanical securing of the composite body to the wooden body is effected and, in particular, a shear surface of the composite mass is larger than a shear surface of the composite body.

Thus, the connection coupling consists of at least one composite body which comprises at least a local or area-by-area recess and at least a partial intermediate layer. The composite mass provides substantially complete filling of the interstice of the retention recess and the composite body, with the area-by-area recesses of the composite body generating a solid and lasting mechanical engagement with the composite mass. Also, the composite mass is simultaneously held by adhesive forces with the contact surface towards the retention recess in the wooden body. Thus, there is provided mechanical interlocking or doweled joints from composite body to composite mass on the one hand and adhesion from composite mass to wooden body on the other.

The recess in the composite body is characterized in particular by the shear surface of the composite mass preferably being greater than the shear surface of the composite body. This results from the fact that the strength of the composite body is greater than the strength of the composite mass. Thus, the ratio of shear surface to material strength of the composite mass and of the composite body is an important aspect for the geometrical design. Therefore, in thin-walled composite bodies, for instance, it is preferred to have versions where opposite recesses are able to meet, thus forming a continuous opening of the hole-type. In this case, the continuous composite mass has the function of a dowel-type holding bridge between the two opposite wood opening surfaces even without any adhesive junction with the composite body. The adhesion of the composite mass with the wooden wall provides back-anchoring of the dowel-type holding bridges.

Advantageously, after hardening, the composite mass causes nearly complete adhesion at a wooden surface of the retention recess in the wooden body. This results in a particularly strong unit of composite mass and wooden body.

Very safe retention/grip is achieved if the local or area-by-area recess is formed in a partially or completely continuous fashion across the composite body in a bore-type manner.

Further improvement in retention/grip is achieved if the local or area-by-area recess is formed at a right angle with respect to a load direction and/or the local or area-by-area recess comprises an undercut having an angle greater than 90°, which in particular, may be formed in a curved manner. This causes a dowel-joint effect between the composite body and the composite mass without forcing them apart. Surprisingly, it has been shown that with a slight undercut, i.e. an angle greater than or equal to 90°, the engagement or dowel-type joints become even more intimate. In addition, it has been shown that a curved undercut constitutes a preferred geometrical design.

Safe and rapid filling with composite mass is possible if the composite body comprises a passage for filling composite mass into the interstice, in particular into the local or area-by-area recess and in particular to a lowermost position of the interstice. In the composite body, there is provided a passage, preferably in the form of a bore or a slit, which enables the composite mass to be injected from the outside through the composite body into the inside of the local or area-by-area recess. This guarantees that by targeted and slow filling with composite mass, the air from inside the retention recess in the wooden body can escape. For instance, composite mass is prevented from escaping by an external collar at the composite body.

Complete filling of the interstice as well as a control function is given if an exit for exiting displaced air from the interstice is provided in the retention recess, which exit is preferably provided in the composite body and/or the wooden body.

Advantageously, the composite body comprises a terminal portion, in particular formed in a front portion of the composite body and in particular in the form of an external collar which particularly prevents any composite mass from escaping from the interstice.

In a particularly simple structure, the passage and/or the exit are provided in the terminal portion of the composite body and particularly in the collar. In particular, the passage for filling in the composite mass may be provided within the collar. The exit for venting may be provided in the wooden body and/or in a further bore within the collar.

Advantageously, the intermediate layer is a coating of the surface of the composite body and/or of the contact surface of the composite mass in order to at least partially prevent adhesion of the composite mass and of the composite body. In particular, it is a powder coating and/or a zinc support and/or an oil film and/or a sheet and/or a paint coat.

Advantageously, the composite mass is an adhesive, in particular having one and/or two components, and/or a mortar, in particular a mortar mix, and/or a silicone, wherein the composite mass in particular comprises a portion of fibers and/or reinforcements. Preferably, appropriate simple composite masses may be one or two component adhesives, mortar mixes and silicones. When heavy loads are applied to the connection coupling, fiber portions or reinforcement portions in the composite mass are advantageous.

A greater variety of installation variants may be achieved which may be used according to local conditions if the composite mass is to be filled in before and/or after inserting the composite body into the retention recess in the wooden body.

The object of the invention is also achieved by a method of manufacturing a connection device according to any one of claims 1 to 13, wherein at least one retention recess, in particular a continuous retention recess, is formed in a wooden body, in particular by drilling and/or milling; wherein at least one local or area-by-area recess is formed in a composite body and an intermediate layer is applied, which layer at least partially prevents adhesion of a composite mass to a surface of the composite body; and wherein the composite body is inserted into the retention recess, wherein the composite mass is filled into the retention recess before and/or after inserting the composite body into the retention recess.

Advantageously, the composite mass is filled into an interstice between the composite body and the retention recess through a passage while displaced air escapes preferably from the interstice through an exit.

Further features and advantages of the present invention will become more readily apparent from the claims and the following description where embodiments of the invention are explained in more detail, reference being made to the accompanying drawings.

Figure 1:
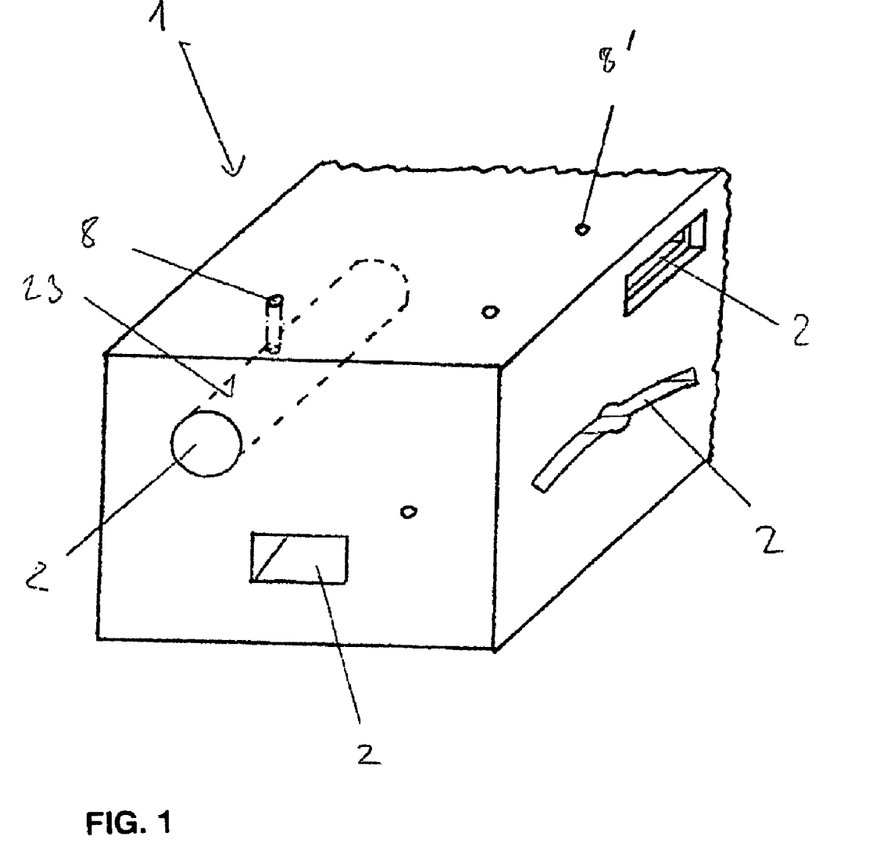
FIG. 1 shows a wooden body with retention recesses.

FIG. 1 shows a wooden body 1 having retention recesses 2 for inserting composite bodies 3 exemplified in the following FIGS. 2, 3, 4, 5, etc. for manufacturing a connection device according to the invention. The geometrtical design of the retention recess 2 is preferably adapted to the geometrical design of the composite body 3. The retention recesses may be worked into the wooden material for instance by drilling, machining, sawing, cutting or the like. Insertion of the composite bodies 3 may be effected immediately after creating the retention recesses or later during installation into an overall construction. The composite mass 4 shown in FIGS. 6 and 7 may be filled in for adhesion to a wooden surface 23 of the retention recess 2 before and/or after inserting the composite body 3 into the corresponding retention recesses 2. After setting of the composite mass and frictionally securing to inserted composite bodies/connection bodies 3, the connection device can be used for receiving a wide variety of different types of loads such as tensile and compressive forces, shear forces and bending moments.

Figure 2:
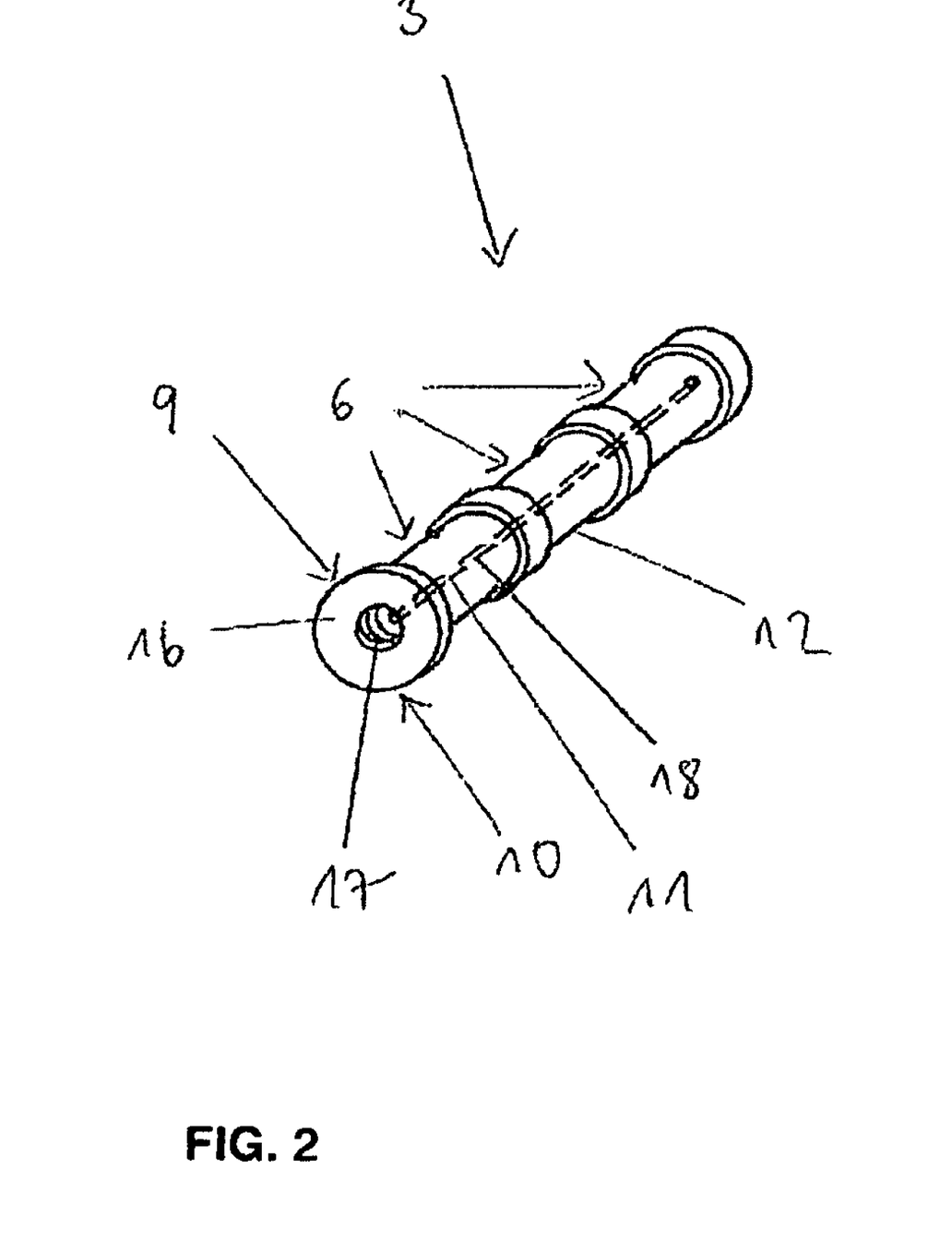
FIG. 2 shows a composite body.

FIG. 2 shows a cylindrical composite body 3, for instance from steel such as a steel composite body, having three circumferential local, i.e. area-by-area recesses 6. An intermediate layer (not shown) on the surface 12 of the composite body 3 can be created for instance by hot-galvanizing the steel composite body. The recesses 6 are for instance equally reduced with respect to the original cross section of the composite body 3, for instance by machining or pressing the composity body 3. At its front portion 10 at the terminal portion 9, the composite body 3 comprises a collar 16, for instance also made from steel, which, after insertion of the composite body 3 into the retention recess 2 shown in FIG. 1, will rest on and contact the wooden body 1 and which prevents the composite mass from exiting the retention recess. In addition, the collar 16 for instance comprises a bore 17 for receiving a screw connection (not shown) which may serve for assembly with a further building component such as a steel support or an armored concrete girder. An exemplary bore 18 in the prolongation of bore 17 in this example serves for filling in the composite mass (not shown) as a passage 11. FIG. 1 shows an exit 8 in the upper portion of the retention recess for the illustrated composite body 3 and through which the air displaced by the composite mass can escape. In addition, possible exiting of composite mass from the exit 8 indicates in the manner of a control opening that the casting/injection is sufficient.

Figure 3:
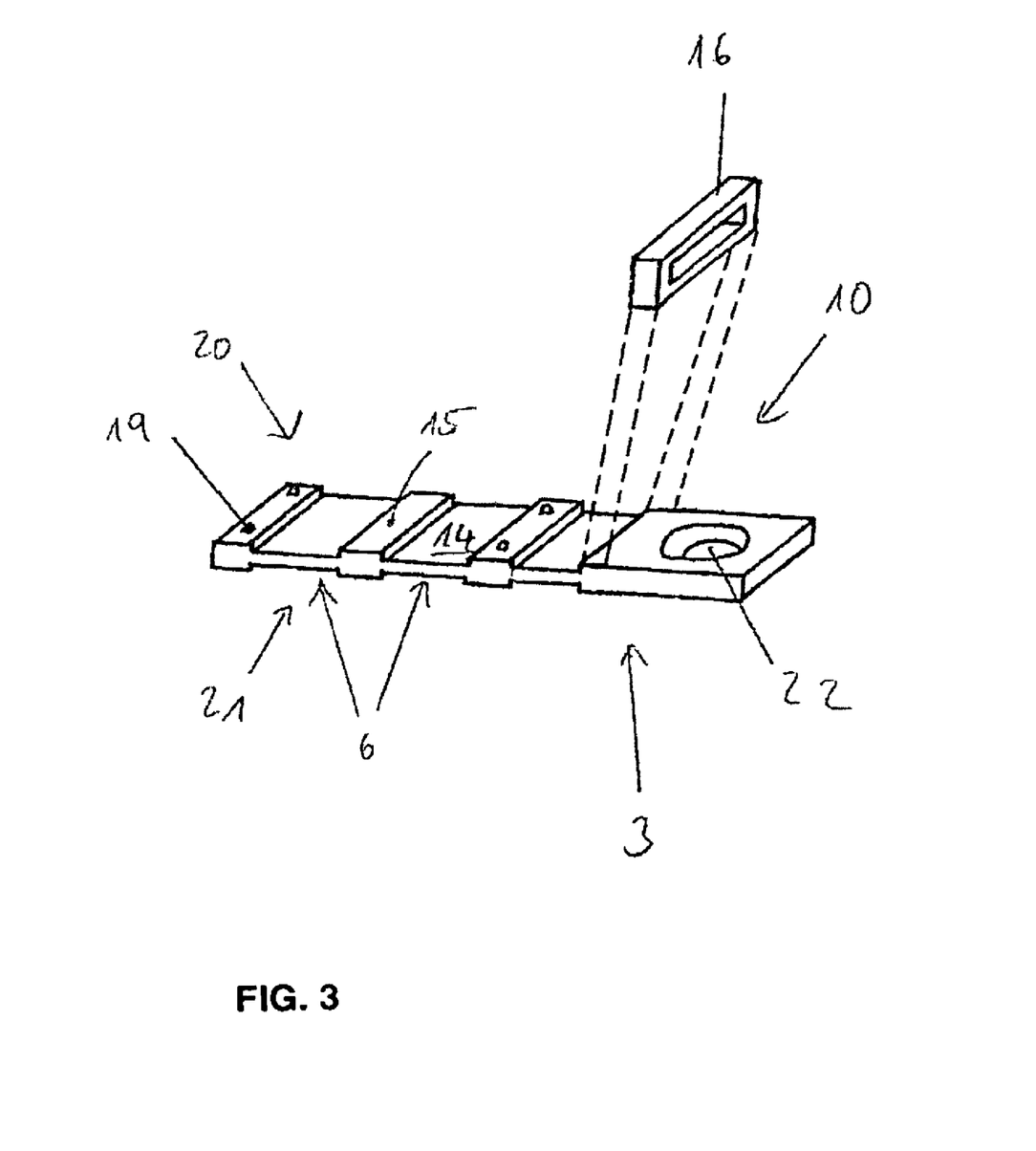
FIG. 3 shows a composite body having a collar.

FIG. 3 shows a rectangular composite body 3, for instance made from steel, having three exemplary recesses 6 at an upper side 20 and a lower side 21 which is formed in adaptation to the corresponding retention recesses 2 of the wooden body 1 of FIG. 1. An intermediate layer (not shown) of the composite body 3 is provided for instance by an oil film which may be deposited using a spraying method. The retention/holding forces of the connection device are determined by the intermediate layer and essentially by the surface area ratio of the illustrated shear surface 14 of the composite mass 4 in relation to the lesser shear surface 15 of the composite body. The composite body 3 is held within the retention recess 2 by a collar 16 which may be made from rubber. Between collar 16 and composite body 3, the composite mass can be injected into the retention recess 2 for instance using an injection needle. Enclosed air together with the excessive composite mass can then escape through an exit 8'. In a front portion 10 of the composite body 3 a bore 22 is provided which, after installation of the composite body 3, extends beyond the wooden body 1 and may be used for assembly with further building components which may be made from armored concrete, wood or steel. Spacers 19 allow the position of the composite body 3 in the retention recess 2 to be secured, thus providing essentially uniform composite mass geometry, as for instance the adhesive groove thickness.

Figure 4:
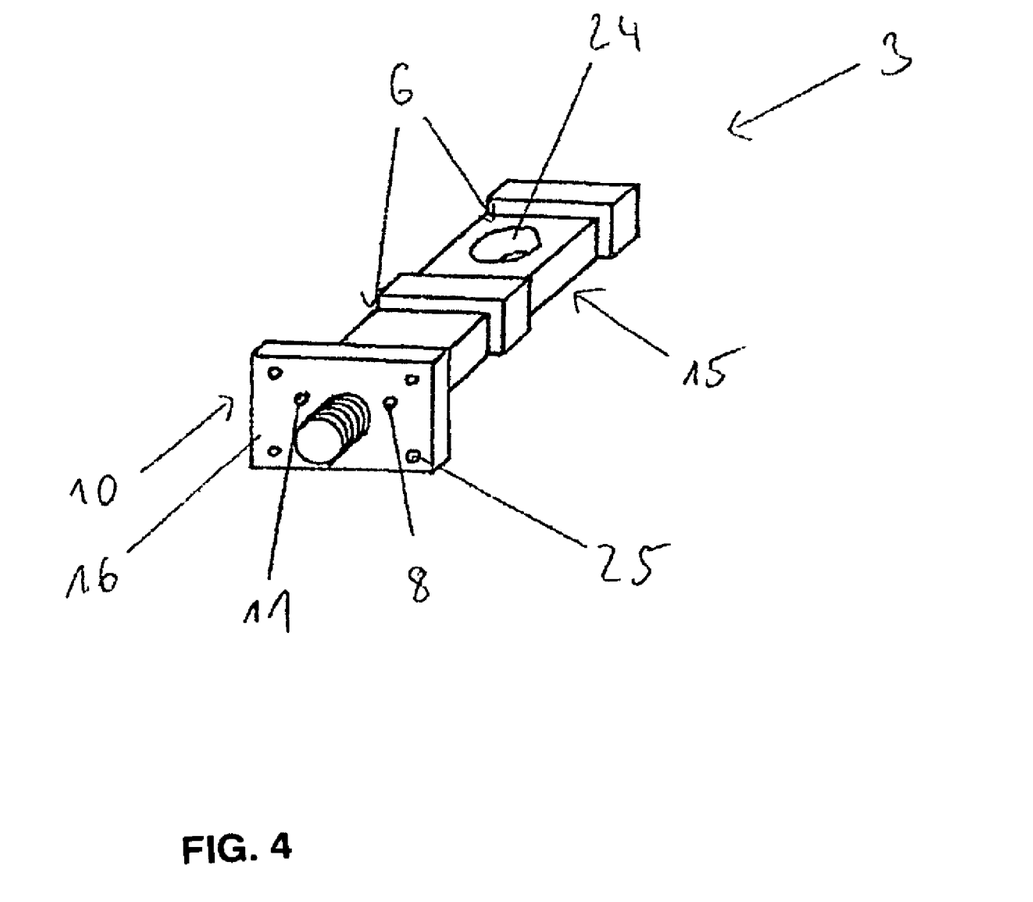
FIG. 4 shows a composite body.

FIG. 4 shows a rectangular composite body 3, for instance made from cast steel, having two recesses 6 and narrowing the composite body 3 at three sides such that there is a flat support for instance in the lower portion of the corresponding retention recess 2 in the wooden body 1. In addition, a further recess 24 in the form of a bore may be provided in a recess 6. After the setting of the composite mass, this results in additional, substantially mechanical retention of the composite body 3 with the composite mass. At the front portion 10 of the composite body 3 a collar 16, for instance made from steel, is provided which may be welded onto the composite body 3. An intermediate layer (not shown) of the composite body 3 is provided for instance as a powder coating. The collar 16 also comprises bores 25 designed for fixing the composite body 3, for instance using nails, at the wooden body after insertion into the retention recess 2. In addition, bores as a passage 11 and exit 8 are provided in the collar 16 for filling in and venting the composite mass.

Figure 5:
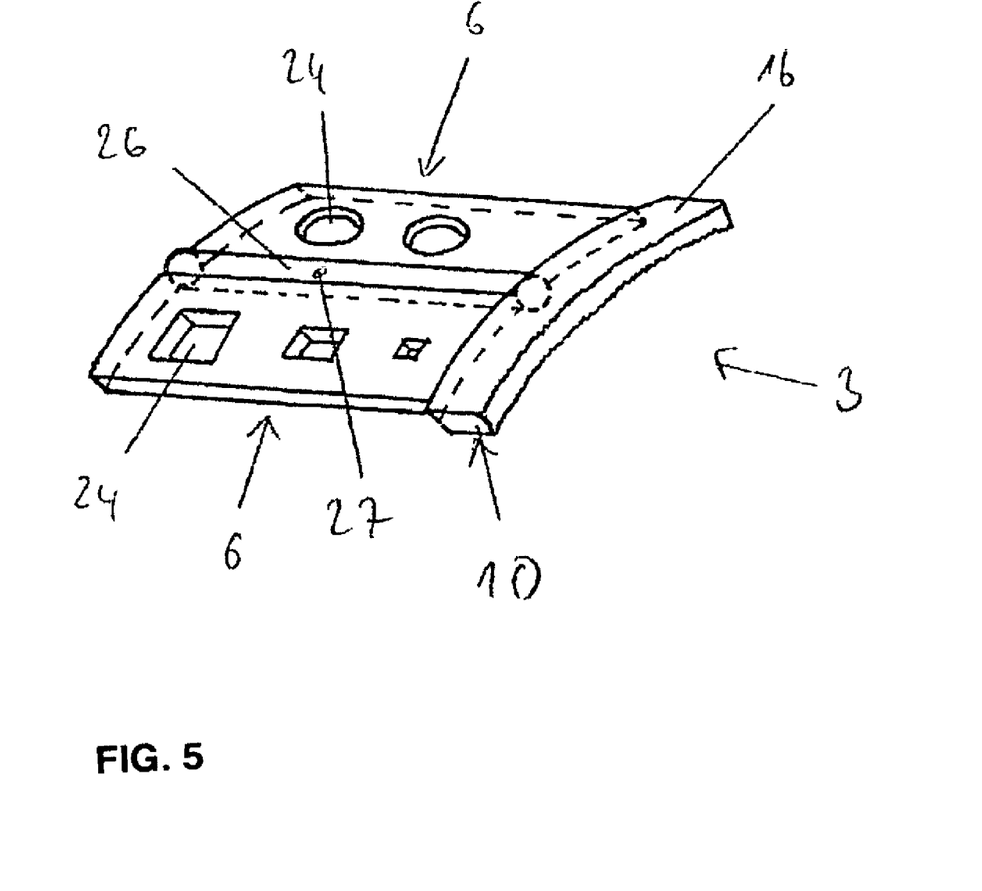
FIG. 5 shows a composite body.

FIG. 5 shows a bent composite body 3 for instance for insertion into the correspondingly shaped retention recess 2 inside the wooden body 1 of FIG. 1. The composite body 3 comprises two recesses 6. The recesses 6 are separated by a cylinder 26. An intermediate layer (not shown) of the composite body 3 is provided for instance by a paint coat. The bent recess 6 of the composite body 3, shown in the foreground, has three additional continuous, i.e. traversing recesses 24 of different dimension and formed as rectancular holes by punching. The recesses 24 may become smaller towards the collar 16 such that in the rear portion of the composite body 3 a larger amount of composite mass will provide more retention/holding force. Furthermore, for instance, two additional recesses 24 are shown as equal bores in the bent recess 6 shown in the background. This composite body 3 is characterized by its large load carrying capacity, as the flux of forces (distribution of forces) from the collar 16 can also be introduced into the deeper portions of the retention recess 2 of the wooden body 1 via the cylinder 26.

After filling in the composite mass into the retention recess 2 of the wooden body 1, the composite body 3 is shifted into the retention recess 2. In this case, the air escapes for instance through the front opening of the retention recess 2 itself. The pressure between the recesses 6 is balanced through a bore 27 in the cylinder 26. Introduction and transmission of the flux of forces from the collar 16 to additional attached building components, for instance made from concrete, wood or steel, can be effected easily and safely.

Figures 6, 6B:
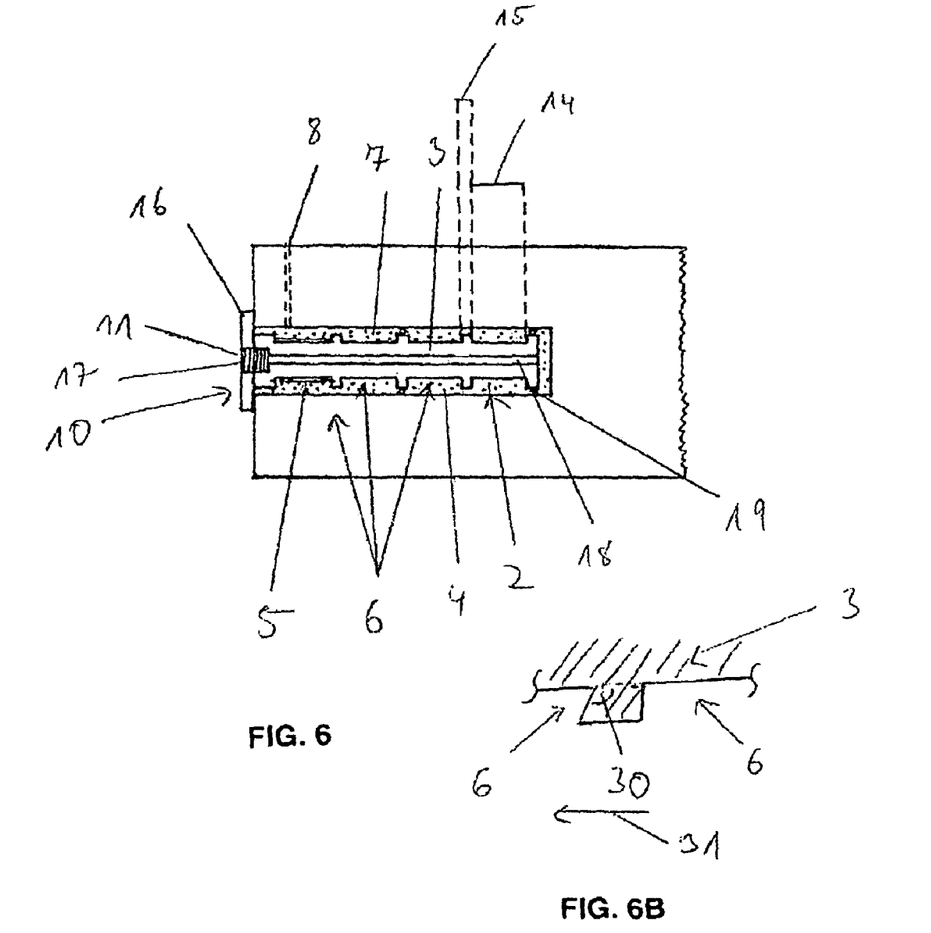
FIG. 6 shows a longitudinal section through a wooden body and an inserted composite body.
FIG. 6b shows an undercut.

FIG. 6 shows a longitudinal section through a connection device. The composite body 3 which is inserted into a retention recess 2 comprises eight substantially equal recesses 6. The composite body 3 may be secured in position by four point-shaped spacers 19. For instance, during a second step, the composite mass 4 will then be inserted through a passage 11, 18 into an interstice 7 of the retention recess 2. The exit 8 allows air to escape during this step. Only after a certain portion of the composite mass 4 starts exiting from the exit 8 is there provided adequate filling. The retention/holding forces of the connection device are essentially determined by the surface area ratio of the shear surface 14, shown in section as a length, of the composite mass 4 in relation to the lesser shear surface 15 of the composite body. At the front portion 10 of the composite body 3 a collar 16, for instance made from a wood material, is fixed and prevents leaking of the composite mass 4. The collar 16 and the composite body 3 comprise an identical bore 17, 18 into which a thread, for instance for a screw connection (not shown) with a further wooden building component, may be machined. The first recess 6 behind the collar 16 is compensated for instance by an intermediate layer 5 in the form of a rubber tape. This intermediate layer 5 eliminates the mechanical junction between the composite mass 4 and the composite body 3. This causes the center of force transmission of the composite body 3 to be shifted deeper into the wooden body 1, thus reducing the risk of splitting of the wooden material 1.

FIG. 6b shows a section from a composite body 3 such as the one in FIG. 6 where the recess/groove 6 is delimited by an undercut having an angle 30 greater than 90° relative to the force direction 31.

Figure 7:
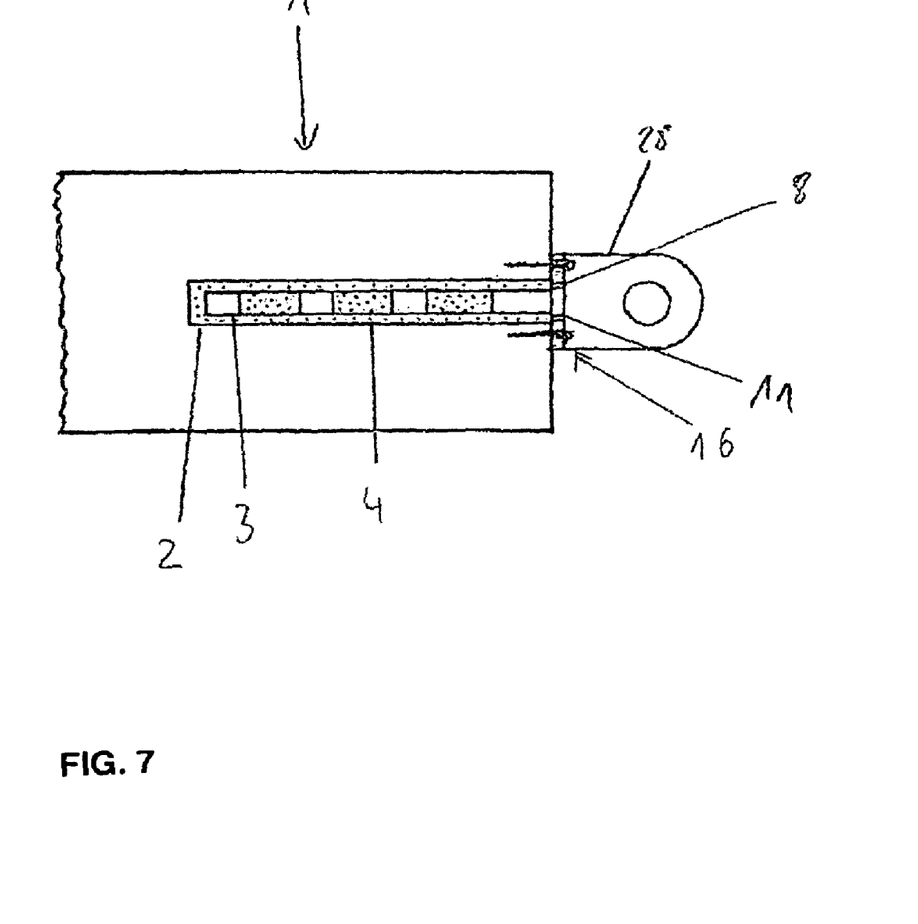
FIG. 7 shows a longitudinal section through a wooden body and an inserted composite body.

FIG. 7 shows a longitudinal section through a connection device. A composite body 3, in particular made from metal, comprises three essentially identical recesses 6 in the form of bores. The composite body 3 is seated in a corresponding retention recess 2 of the wooden body 1 and may be positioned in the wooden body 1 for instance by two screw connections via the collar 16. The composite body 3 receives its load via the collar 16 through a sword/blade 28, in particular made from metal, which may be bolted to another building component (not shown), in particular made from steel, wood or concrete. A passage 11 allows filling of the retention recess 2 with a composite mass 4, for instance a two-component epoxy resin, and the exit 8 located above it functions as a pressure balancing opening or control/monitoring opening. An intermediate layer (not shown) is provided for instance by a fire-resistant or fire-retardant paint coat of the composite body 3 as well as the collar 16 and the sword/blade 28.

Figure 8:
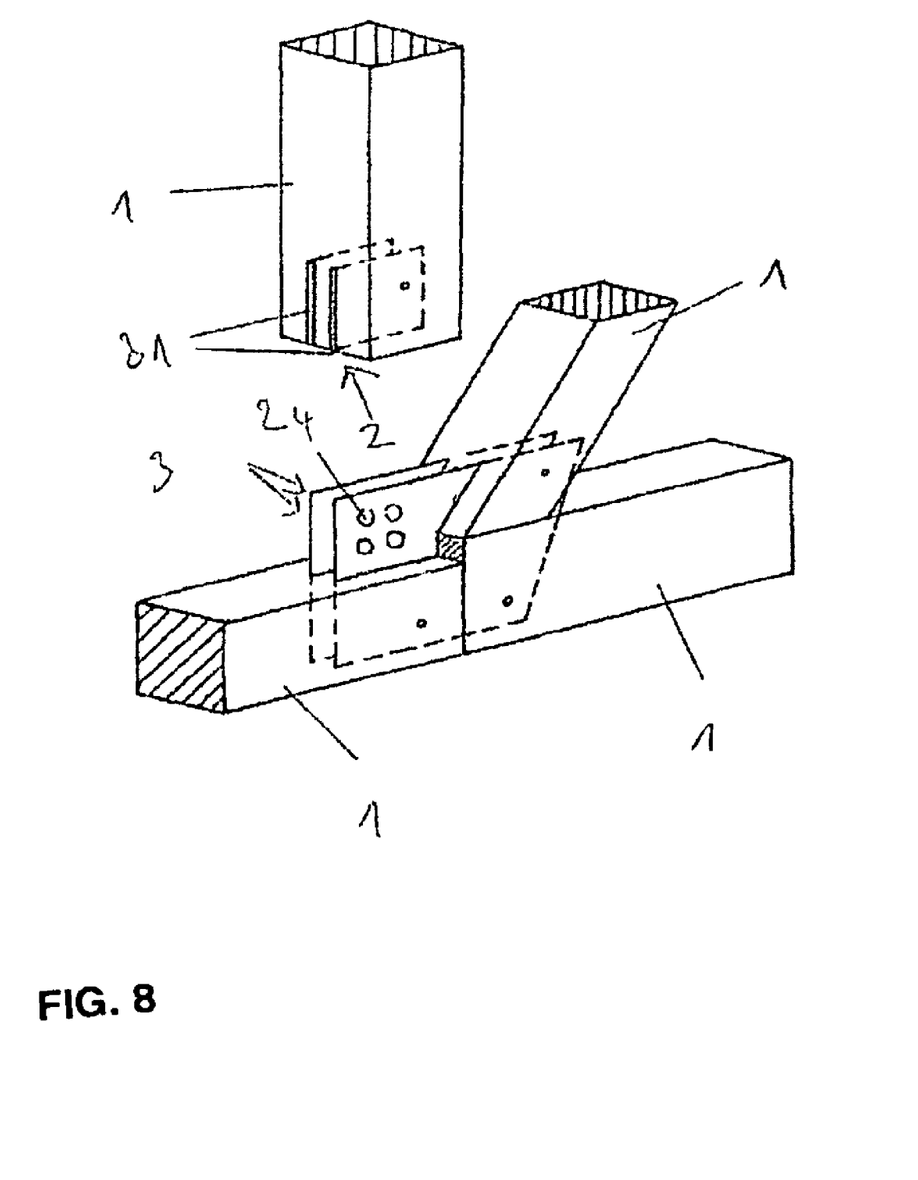
FIG. 8 shows a connection device having several composite bodies.

FIG. 8 is an illustration of a connection device. The illustration clarifies that the connection device acording to the present invention may comprise at least one, but preferably also several receiving components, for instance wooden bodies 1, which may be connected by one or by several composite bodies 3 in terms of the invention. The retention recesses 2 of the several building components, in particular wooden bodies 1, can then advantageously be continued between the building components, in particular wooden bodies 2. FIG. 8 shows four wooden bodies 1 which are connected to each other by frictional connection and/or by positive locking connection. The connection device thus shows in an exemplary manner an application where a composite body 3 can be connectingly engaged with several wooden bodies 1 simultaneously. The composite bodies 3 extend into the wooden bodies 1 via corresponding retention recesses 2 and are anchored there for instance by using a composite mass, in particular adhesive mass such as polyurethane. For instance, the composite bodies comprise recesses 6, 24 which are only partially shown here. Thus, a mechanical retention/holding force of the composite bodies 1 is provided after the setting of the composite mass. The composite bodies may consist of steel. An intermediate layer (not shown) of the composite bodies 3 is provided by zinc-galvanizing (not shown).

In order to manufacture the connection device, the composite bodies 3 can be shifted into the corresponding retention recesses 2 of the wooden bodies 1, then joined and for instance fixed by a screw connection (not shown). At a later time, in the factory or at the construction site, the composite mass, in particular the adhesive mass, can then be injected into the retention recesses 2 through filling openings until it starts leaking at the exits. Using a special device such as an adhesive tape (not shown) or a batten/ledge, the retention recesses which have a lateral opening 31 can be closed, thus preventing the composite mass from leaking.

Figure 9:
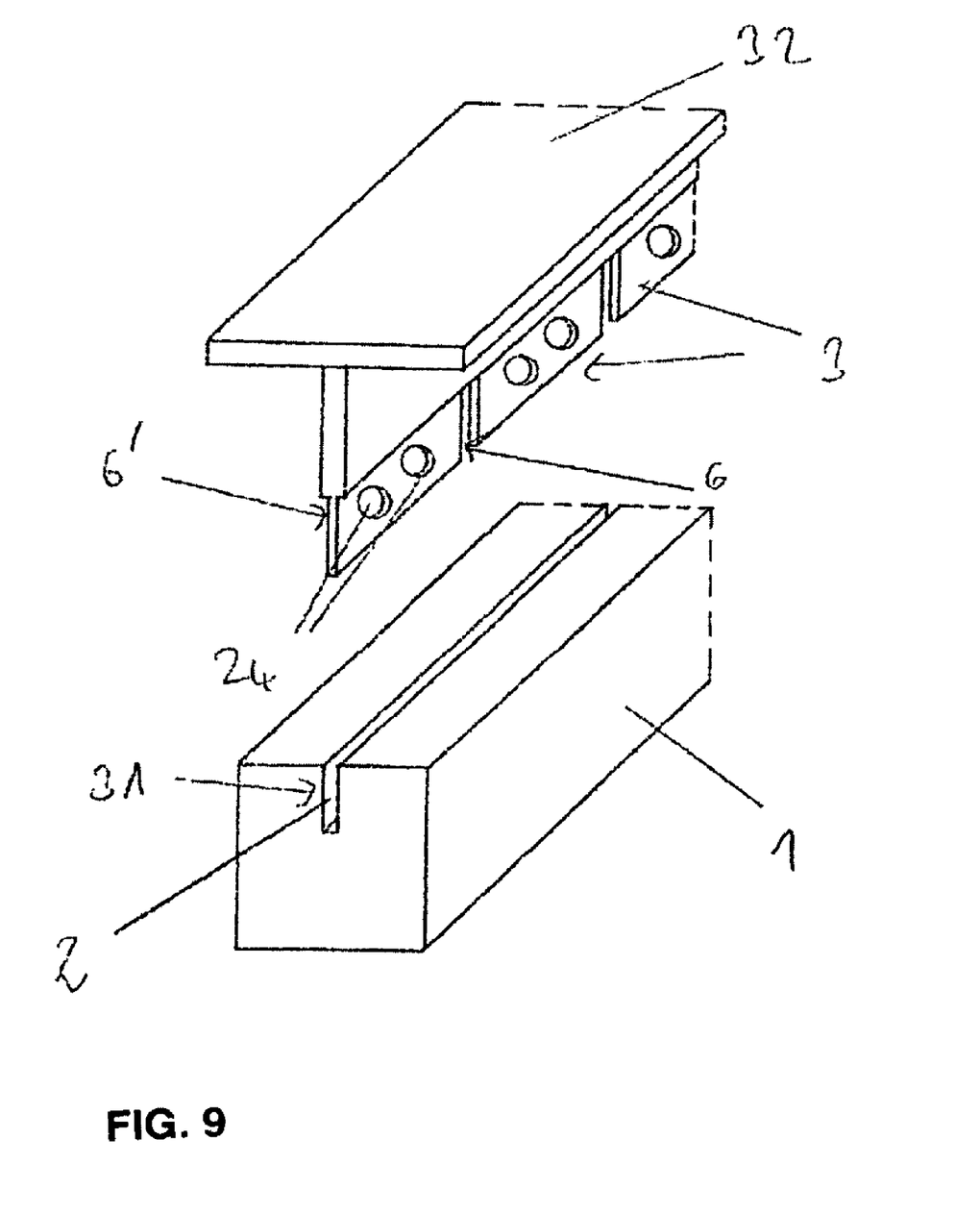
FIG. 9 shows a connection device.

FIG. 9 is an illustration of a connection device showing only a partial section. A wooden body 1, for instance a layered wooden board or board-type plywood, is connected by frictional connection and/or by positive locking connection via a composite body 3 with a further building component 32 such as a metal body. The composite body 3 extends into the wooden body 1 through a corresponding retention recess 2 and can be anchored there using a composite mass, in particular an adhesive mass such as a two-component epoxy resin. The composite body 3 comprises several, for instance five recesses 24 in the form of perforations as well as two local, i.e. area-by-area recesses 6 in form of notches and further recesses 6' in the form of tapers of the cross-sectional profile. Due to the recesses 6, 6' and 24, there is provided good mechanical retention of the composite body 3 after the setting of the composite mass. The recesses 6' further allow the composite body 3 to be positioned in the wooden body 1 and at the same time prevent leaking of the composite mass (not shown) from the retention recess 2. The composite body 3 as well as the building component 32 may be made from steel. The intermediate layer (not shown) of the composite body 3 can be created by a paint coating.

In order to manufacture the connection device, a corresponding retention recess 2 can be produced in the composite body 3 by making a saw cut. In a second step, the composite mass can be filled into the retention recess 2. The composite body 3 can now be partially shifted into the wooden body 1 until the stop, created by the recesses 6', rests on the wooden body 1. Using a corresponding shaped part such as a metal bolt or a nail, an opening 31 at one side of the retention recess 2 can be closed in order to prevent the composite mass from leaking. If both the building component and the composite body are made from metal, the composite body 3 and the building component 32 can be welded to each other at their contact surface. In another embodiment, the composite body 3 and the building component 32 may be composed of a rolled section. In this case, the recesses 6' at the composite body 3 can be produced by rollers.

LIST OF REFERENCE NUMERALS

1 wooden body
2 retention recess/holding recess
3 composite body
4 composite mass
5 intermediate layer
6, 6' local recess/area-by-area recess
7 intermediate space/interstice
8, 8' exit
9 terminal portion
10 front portion
11 passage
12 surface
14 composite mass shear surface
15 composite body shear surface
16 collar
17 bore
18 bore
19 spacer
20 upper side
21 lower side
22 bore
23 wooden surface
24 recess
25 bore
26 cylinder
27 bore
28 sword/blade
29 bore
30 undercut angle
31 opening
32 building component

The invention claimed is:

1. Connection device of at least one receiving building component formed of wood which comprises at least an elongated retention recess having a proximal and a distal end, and having at least one composite body having a proximal and a distal end, which is inserted into said retention recess in said wooden body such that the proximal end of the retention recess is located adjacent the proximal end of the composite body, wherein a composite mass is curably inserted in an interstice in said retention recess between said wooden body and said inserted composite body such that the composite body is substantially frictionally secured in said retention recess, wherein an intermediate layer, disposed at the surface of the composite body is at least partially provided between said composite body and said composite mass, said intermediate layer being functionally disposed in the region of the proximal end of the composite body and not functionally disposed in the region of the distal end of the composite body, the intermediate layer providing at least partial decoupling of said composite mass from said composite body.

2. Connection device according to claim 1, wherein said composite body comprises at least a local recess formed such that after setting of the composite mass in the interstice, in particular in said local recess, frictional mechanical securing of said composite body to said wooden body is effected and, in particular, a shear surface of said composite mass is larger than a shear surface of said composite body.

3. Connection device according to claim 1, wherein after hardening, said composite mass causes nearly complete adhesion at a wooden surface of the retention recess in said wooden body.

4. Connection device according to claim 1, wherein a local recess is formed in a partially or completely continuous fashion across said composite body in a bore-type manner.

5. Connection device according to claim 1, wherein a local recess is formed at a right angle with respect to a load direction.

6. Connection device according to 1, wherein a local recess comprises an undercut having an angle greater than 90°, which may be formed in a curved manner.

7. Connection device according to claim 5, wherein said composite body comprises a passage for filling said composite mass (4) into said interstice, in particular into said local recess and in particular to a lower-most position of said interstice.

8. Connection device according to claim 1, wherein an exit for exiting displaced air from said interstice is provided in said retention recess (a), said exit particularly being provided in said composite body and/or said wooden body.

9. Connection device according to claim 1, wherein said composite body comprises a terminal portion, in particular formed in a front portion of said composite body and in particular in the form of an external collar, said collar particularly preventing any of the composite mass from escaping from said interstice.

10. Connection device according to claim 1, wherein a passage and/or an exit is provided in the terminal portion of said composite body, particularly in said collar.

11. Connection device according to claim 1, wherein said intermedi-ate layer is a coating of the surface of said composite body for at least partially preventing adhesion of said composite mass and of said composite body, in particular a powder coating and/or a zinc support and/or an oil film and/or a sheet and/or a paint coating.

12. Connection device according to claim 1, wherein said composite mass is an adhesive, said composite mass in particular comprising a portion of fibers and/or reinforcements.

13. Connection device according to claim 1, wherein said composite mass is to be filled in before and/or after inserting said composite body into the retention recess in said wooden body.

14. Method of manufacturing a connection device as claimed in claim 1, wherein at least one retention recess is formed in a wooden body, by drilling and/or milling; wherein at least one local recess is formed in a composite body and an intermediate layer is functionally disposed at the proximal end of the retention recess and not functionally disposed in the region of the distal end of the composite body, said layer at least partially preventing adhesion of a composite mass to a surface of said composite body; and wherein the composite body is inserted into the retention recess, said composite mass being filled into said retention recess before and/or alter inserting said composite body into said retention recess.

15. Method according to claim 14, wherein said composite mass is filled into an interstice between composite body and retention recess through a pas-sage while displaced air escapes preferably from said interstice through an exit.

16. The connection device according to claim 12, wherein the ad-hesive is selected from a group of adhesives consisting of a single component adhesive, a two or more component adhesive, a mortar, a mortar mix, and silicon.

* * * * *

UNITED STATES PATENT AND TRADEMARK OFFICE
CERTIFICATE OF CORRECTION

PATENT NO. : 8,186,124 B2
APPLICATION NO. : 12/324929
DATED : May 29, 2012
INVENTOR(S) : Tobias Bathon It is certified that error appears in the above-identified patent and that said Letters Patent is hereby corrected as shown below:

In Col. 8, line 54, replace the phrase "intermedi-ate layer" with --intermediate layer--.

In Col. 10, line 3, replace the phrase "pas-sage while displaced air" with --passage while displace air--.

In Col. 10, line 6, replace the phrase "the ad-hesive is selected" with --the adhesive is selected--.

Signed and Sealed this
Seventh Day of August, 2012

David J. Kappos
*Director of the United States Patent and Trademark Office*